June 24, 1958 J. R. MITCHELL ET AL 2,840,194
SHOCK-ABSORBING AIR CUSHION
Filed Nov. 28, 1955 2 Sheets-Sheet 1
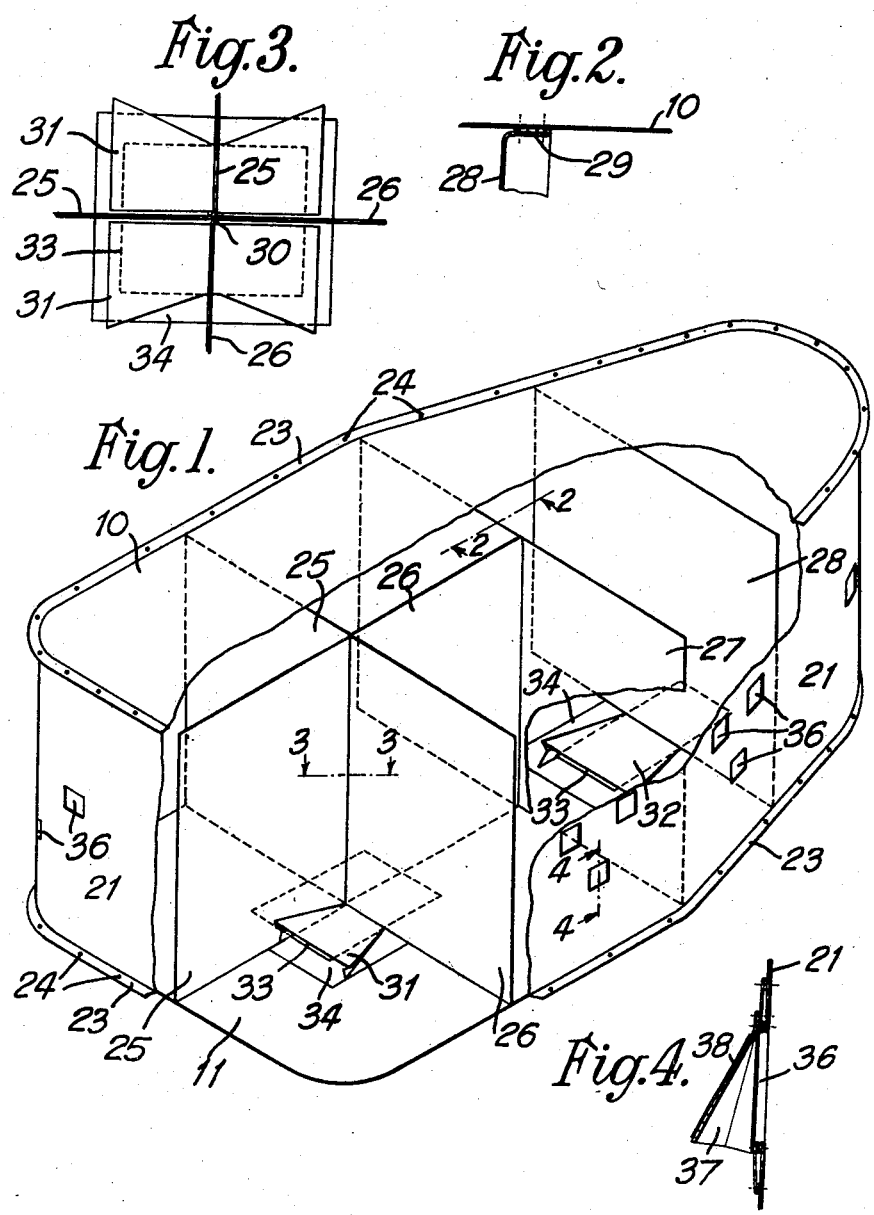
INVENTORS
John R. Mitchell
William T. Rollings
By Shoemaker & Mattare
ATTORNEYS June 24, 1958  J. R. MITCHELL ET AL  2,840,194
SHOCK-ABSORBING AIR CUSHION
Filed Nov. 28, 1955  2 Sheets-Sheet 2
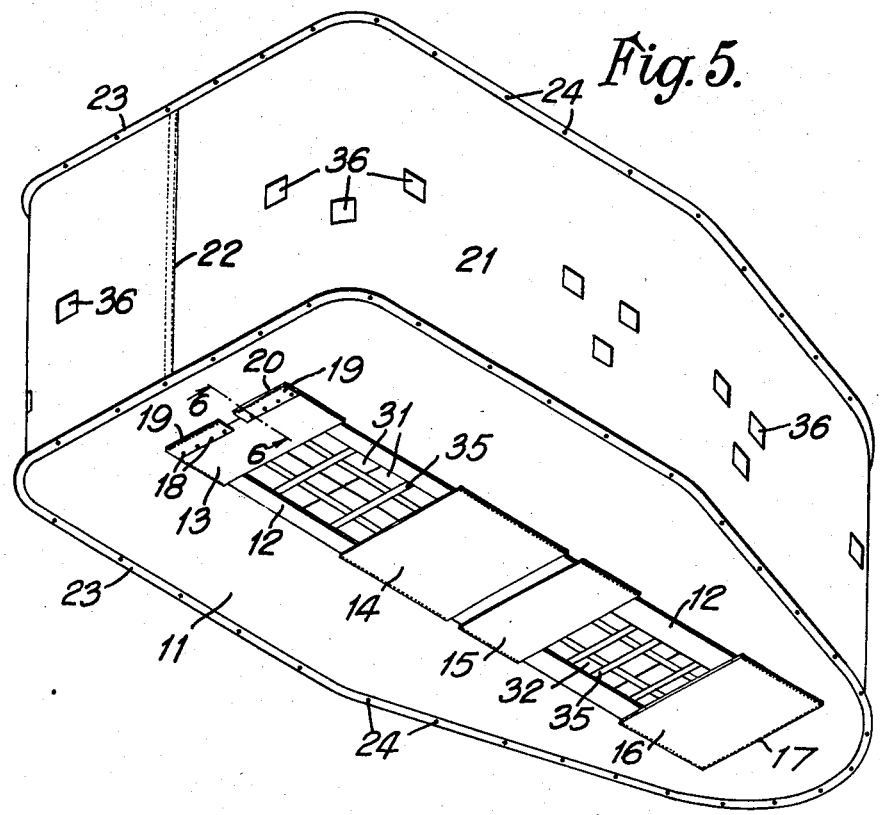
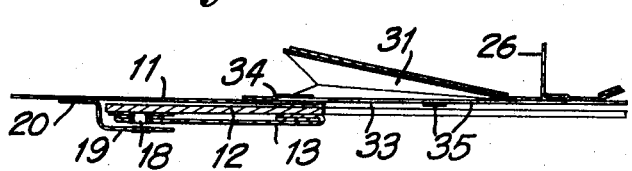
INVENTORS
John R. Mitchell
William T. Rollings
By Shoemaker & Mattare
ATTORNEYS

United States Patent Office 2,840,194
Patented June 24, 1958

2,840,194

SHOCK-ABSORBING AIR CUSHION

John Rothwell Mitchell and William Thomas Rollings, Woking, England, assignors to G. Q. Parachute Company Limited, Woking, England, a British joint-stock company Application November 28, 1955, Serial No. 549,365

Claims priority, application Great Britain December 6, 1954

2 Claims. (Cl. 188—87)

This invention relates to shock-absorbing air cushions for loads falling to the ground, and more particularly for stores and equipment descending by parachute from the air. For example, rocket motors used temporarily upon aircraft to assist the take-off from the ground may be dropped after the take-off when they have performed their function, in order to relieve the aircraft of their dead load; such equipment being of relatively costly construction, it is desirable that no damage should be sustained at landing.

The invention has for its main object to provide a shock-absorbing cushion for loads falling to the ground, whereby the risk of damage at landing may be minimized.

A specific object of the invention is to provide an improved device of this character adapted to absorb the shock of landing without rebound.

A further object of the invention is to enable the dropped load to glide over the ground in any direction, according to the drift of the parachute, after the downward motion has been arrested, without the load rolling over on the ground, whereby the upper part of the load might be damaged by impact.

Another object of the invention is to provide an improved cushion of this character which will become inflated automatically during the descent of the load, and upon striking the ground will be deflated first by a relatively slow escape of air and subsequently by an accelerated deflation which allows the cushion to collapse under the load.

Other objects and advantages of the invention will hereinafter appear from the following description, given with reference to the accompanying drawings, in which:

Fig. 1 is a perspective view of the improved air cushion in one embodiment, part of the top and side walls being broken away to reveal the internal diaphragms and one of these diaphragms being partly broken away to reveal an inlet valve beyond it.

Fig. 2 is a detail in section, on a larger scale, on the line 2—2 of Fig. 1.

Fig. 3 is a detail in plan, also on a larger scale, taken at the level 3—3 in Fig. 1.

Fig. 4 is a detail in section, also on a larger scale, on the line 4—4 of Fig. 1, showing one of the outlet valves.

Fig. 5 is a perspective view of the air cushion, as seen from beneath, showing the base fitted with a rigid panel.

Fig. 6 is a detail in section, on a larger scale, on the line 6—6 of Fig. 5.

As illustrated, the air cushion comprises a top surface 10 to which a load to be dropped by parachute from an aircraft can be attached by any convenient means (not shown), the cushion hanging from the load during descent until it comes to land, whereupon the cushion supports the load so as to absorb the shock. The top surface may be made of flexible fabric or of rigid material, according to the means of attachment employed.

The base 11 of the cushion consists of flexible and porous fabric such as canvas, fitted with a panel 12 of rigid material such as plywood, which is held in position by pockets 13, 14, 15, 16, as seen in Fig. 5; the first three pockets are open at both ends so that the panel 12 can be slipped longitudinally into place through them, but the fourth pocket 16 is closed at the end by stitching to the base, as indicated at 17. At the other end of the panel 12, the pocket 13 is provided with eyelets 18 or the like, for lacing to similar means upon the edge of one or more lacing strips 19 stitched to the base 11, as indicated at 20, so that this pocket can be closed after the panel is in place.

The side walls 21 consist of flexible and porous material such as canvas, made in one or more lengths joined by stitching as indicated at 22 in Fig. 5, the top and bottom edges of the side walls being connected to the top surface 10 and to the base 11 respectively, by seams 23, which may be secured by stitching or by eyelets 24.

The porosity of the canvas or other flexible material used for the base 11 and side walls 21, and also if desired for the top surface 10, will depend upon the weight of the load, the size of the cushion, and other circumstances, the object being to allow the slow escape of air as the cushion becomes inflated and the subsequent deflation of the cushion by escape of the enclosed air when the base 11 reaches the ground. The cushion, which will normally have been stowed on the aircraft in a collapsed condition, packed flat against the load to be dropped, is inflated during the descent by entry of air through inlet valves, as hereafter described; the subsequent deflation is facilitated by the provision of one or more outlet valves, also hereafter described, to supplement the escape of air through the porous canvas or other flexible material.

The interior of the cushion is divided into sections or compartments by a number of diaphragms 25, 26, 27, 28, as shown in Fig. 1, these diaphragms being made of flexible material such as canvas, arranged in vertical planes. Each of these diaphragms is secured to the top surface 10 and to the base 11, as well as to the side walls 21, by seams 29 such as shown in Fig. 2, so that each compartment is independently inflatable and deflatable. The two diaphragms 25, 26 are preferably arranged as shown in section in Fig. 3, each being bent to form a right-angled corner 30, and these two corners being secured together by vertical stitching. The other two diaphragms 27, 28 extend straight across the cushion, the diaphragm 27 being secured centrally to the adjacent edge of the diaphragm 26 by a vertical seam similar to that shown in Fig. 2; these seams are omitted from Fig. 1 for the sake of clarity. The cushion thus comprises six separate compartments, each of which is provided with an inlet valve; one of these inlet valves can be seen at 31 in Fig. 1, there being three similar valves in the adjacent compartments, as shown in Fig. 3. Another inlet valve in the fourth compartment can be seen at 32 in Fig. 1, there being a similar valve in the next compartment on the other side of the diaphragm 28.

The base 11 is apertured to provide openings 33 controlled by these inlet valves 31, 32, the edges of the openings being reinforced by binding strips 34; the base panel 12 is likewise apertured, as seen in Figs. 5 and 6, below the openings 33 and the inlet valves. Across the openings 33 there are stretched cross-braces in the form of tapes 35, which intersect and are stitched together at their crossing points.

The side walls 21 are provided with vent openings 36 communicating with the several compartments of the cushion, each of these openings being controlled by an outlet valve 37 such as shown in Fig. 4; preferably the outlet valves consist of canvas or other flexible fabric flaps, stitched to the wall 21 along their top edges and down their sides, and fitted with reinforcing panels 38 made of thin vulcanized fibre or the like, and the inlet valves are preferably of similar construction.

The outlet valves normally hang down on the inside of the cushion and loosely over the openings 36, against which they will be applied by the slight internal air pressure built up during the descent of the cushion when the air enters through the inlet valves 31, 32; when the cushion strikes the ground, the pressure increases to a considerable value as the walls 21 begin to collapse, this pressure closing the inlet valves. The outlet valves 37 being already closed, the escape of air is restricted substantially to that allowed by the porosity of the fabric, which is the main factor in obtaining the gradual deflation, but eventually the increase of internal pressure forces the outlet valves 37 open by blowing their flaps through the openings 36 and thus allows the pressure to escape, causing a more rapid deflation of the cushion. The outlet valves 37 therefore control the maximum or peak pressure during landing and by the final ventage which they provide for the enclosed air, they eliminate risk of the load rebounding from the ground.

The flexibility of the side walls 21 enables the edge of the base 11 which first makes contact with the ground at landing to collapse without affording any firm support on which the cushion can rock, with risk of the load rolling over upon it; the other edges and side walls similarly collapse in turn as the cushion becomes deflated due to the escape of air.

In the embodiment illustrated, the air cushion is of substantially rectangular shape towards one end, with its opposite sides converging slightly near the other end, which is rounded; it will however be understood that the cushion may be of any desired shape and size, according to the dimensions and weight of the load, for example, circular, elliptical or rectangular in plan, with correspondingly shaped side walls, of a height dependent on the extent of the cushioning action to be provided for absorbing the shock at landing. Two or more separate cushions or units can be secured together, for example by connecting their flat vertical ends either permanently, as by stitching, or temporarily, as by lacing or by mechanical means, so as to provide a cushion of larger size suitable for a heavier load. Any desired number of inlet and outlet valves may be provided, located in any convenient positions.

The porosity of the canvas or other fabric used for the top surface, side walls and/or base of the cushion is preferably such that during the descent the escape of air through the fabric just balances the entry of air through the inlet valves, providing a slight rise of pressure inside the cushion sufficient to maintain the escape at this balancing value until the base strikes the ground; thereupon the pressure builds up rapidly as the walls begin to collapse, all the valves remaining closed until the internal pressure is sufficiently high to blow the outlet valves 37 through their openings 36.

What we claim is:

1. A shock-absorbing air cushion for a load falling to the ground, said cushion being made mainly of flexible material and including a surface area having sufficient porosity for escape of air through said surface area by slight air pressure inside said cushion, means for admission of air to said cushion during its descent with a load, and at least one outlet valve for escape of air from said cushion, said outlet valve comprising a flexible flap supported inside said cushion and cooperating with an aperture therein, said flap being normally clear of said aperture but adapted to close said aperture upon slight rise of pressure inside said cushion and thereafter to blow through said aperture for escape of air from said cushion when the air pressure inside said cushion increases due to collapse of said cushion when it strikes the ground.

2. A shock-absorbing air cushion for a load falling to the ground, comprising a top surface for attachment of the load, a base surface, and side walls made of flexible material having sufficient porosity for escape of air therethrough by slight air pressure inside said cushion, means for admission of air to said cushion during its descent with a load, said side walls being apertured for escape of air from said cushion, and valve means for sealing the apertures in said side walls, said valve means being normally open but adapted to close upon slight use of pressure due to admission of air during descent and arranged to blow through said apertures when the air pressure inside said cushion increases due to collapse of said flexible walls when said base surface strikes the ground.

References Cited in the file of this patent

UNITED STATES PATENTS

| 1,445,486 | Cats | Feb. 13, 1923 |
| 2,324,685 | Ekman et al. | July 20, 1943 |
| 2,712,913 | Stanley | July 12, 1955 |
| 2,713,466 | Fletcher et al. | July 19, 1955 |

FOREIGN PATENTS

| 542,335 | Great Britain | July 20, 1943 |